(12) United States Patent
Sun et al.

(10) Patent No.: US 8,599,739 B2
(45) Date of Patent: Dec. 3, 2013

(54) REMOTELY WEIGHTED SDMA TRANSMISSION

(75) Inventors: Yong Sun, Bristol (GB); Ngoc-Dung Dao, Bristol (GB); Filippo Tosato, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 203 days.

(21) Appl. No.: 13/081,792

(22) Filed: Apr. 7, 2011

(65) Prior Publication Data

US 2011/0249613 A1    Oct. 13, 2011

(30) Foreign Application Priority Data

Apr. 7, 2010   (GB) .................................. 1005794.1

(51) Int. Cl.
*H04J 1/10* (2006.01)
(52) U.S. Cl.
USPC ......................................................... 370/315
(58) Field of Classification Search
None
See application file for complete search history.

(56) References Cited

U.S. PATENT DOCUMENTS

| 2007/0281613 | A1* | 12/2007 | Lee et al. ........................ 455/15 |
| 2009/0197603 | A1* | 8/2009 | Ji et al. ........................... 455/436 |
| 2010/0120360 | A1* | 5/2010 | Haustein et al. ................ 455/15 |
| 2013/0044674 | A1* | 2/2013 | Teyeb et al. ................... 370/315 |

FOREIGN PATENT DOCUMENTS

| JP | 7-87011 | 3/1995 |
| JP | 2007-67726 | 3/2007 |
| JP | 2008-48236 | 2/2008 |
| JP | 2009-290449 | 12/2009 |
| WO | WO 2009/024018 A1 | 2/2009 |

OTHER PUBLICATIONS

Japanese Office Action issued Oct. 9, 2012, in Japan Patent Application No. 2011-085190 (with English translation).
Japanese Office Action mailed Jul. 2, 2013, in corresponding Japanese Patent Application 2011-085190 (with English translation).

* cited by examiner

*Primary Examiner* — Raj Jain
(74) *Attorney, Agent, or Firm* — Oblon, Spivak, McClelland, Maier & Neustadt, L.L.P.

(57) ABSTRACT

The present disclosure concerns the harnessing of the effect of a relay to enhance the ability to avoid the effect of interference at mobile stations. This is achieved either by overlaying beamforming for an indirectly reached mobile station so that a relay passes on this beamforming to the mobile station concerned, and retaining orthogonality therewith, or by harnessing a base station and a relay station together so that their combined effect is to provide spatial multiplexing to two or more mobile stations.

17 Claims, 5 Drawing Sheets

REMOTELY WEIGHTED SDMA TRANSMISSION

FIELD

Embodiments described herein reside in the field of wireless communication, specifically SDMA transmission.

BACKGROUND

Wireless communication relies upon access to a portion of the electromagnetic spectrum suitable for use for carriage of signals for reception by passive antennas. This portion of the spectrum is commonly known as the radio spectrum.

The radio spectrum provides a finite resource for use by a variety of operators. The use of the radio spectrum is very often Government regulated, and is considered a public asset of a strategic nature. This, and the physical bound of the radio spectrum, imposes a limit on the design of cellular radio systems.

Rather than allocating parts of the radio spectrum for exclusive use by particular operators, various forms of sharing of bands have been established. A variety of communications protocols allow operators to organise the manner in which they will share a particular band of frequency for intermittent, occasional or constant use.

In practice, all sharing methods involve some form of interference, which is proportional to the power of transmitted signals. For voice services, transmitter power control has been shown to improve performance by balancing signals and with respect to interference.

As the demand for transmission of data by wireless means increases, the allocation of resource to satisfy diverse quality of service (QoS) requirements is of interest. Since the characteristics of data services differ from those of voice services, a different approach to transmission needs to be investigated.

BRIEF DESCRIPTION OF DRAWINGS

Specific embodiments will now be described, with reference to the accompanying drawings, in which.

DETAILED DESCRIPTION

In the following description, the presented concept will be demonstrated with the aid of specific embodiments thereof, and their operation, together with detailed mathematical description as appropriate.

In a conventional mobile transmission system, communication is established by means of a base station which can establish communication with mobile stations within its range. This range is often known as a cell. Communication of different mobile terminals with respective base stations (with associated cells) can cause interference between the cells. This is known as intercell interference. For a conventional deployment of base stations (with planned design of cells) the size of cells is sufficiently large, and radio spectrum can be designed and pre-allocated to avoid interference. At the edges of cells, mobility management has been developed to handle inter-cell interference by way of various handover mechanisms. Also, because of the relatively large size of such cells, the level of interference is generally low and can fairly easily be controlled. This can be by way of power control and handover can be affected reasonably quickly.

However, existing concepts have generally been developed with the intent to transmit voice data in a wireless communication system comprising a cellular plan. In contrast, data transmission, and particularly services such as Service on Demand (SoD) gives rise to a need to provide a system which can accommodate a range of different needs, such as low quality voice data to high quality real time video transmission. Conventional interference illumination might not accommodate such new applications, as relatively high power high speed transmission might impact very negatively on a low power service.

Furthermore, there is no reason to assume that the existing concept of "cellular coverage" need be retained for ever more. A more flexible approach needs to be accommodated particularly with the introduction of "small cell coverage" applications, such as multihop relays, femto-cells, and so on. With or without such implementations, the QoS of experience as a cell edge under future implementations could be much higher than the conventional definitions anticipate.

Figure 1:
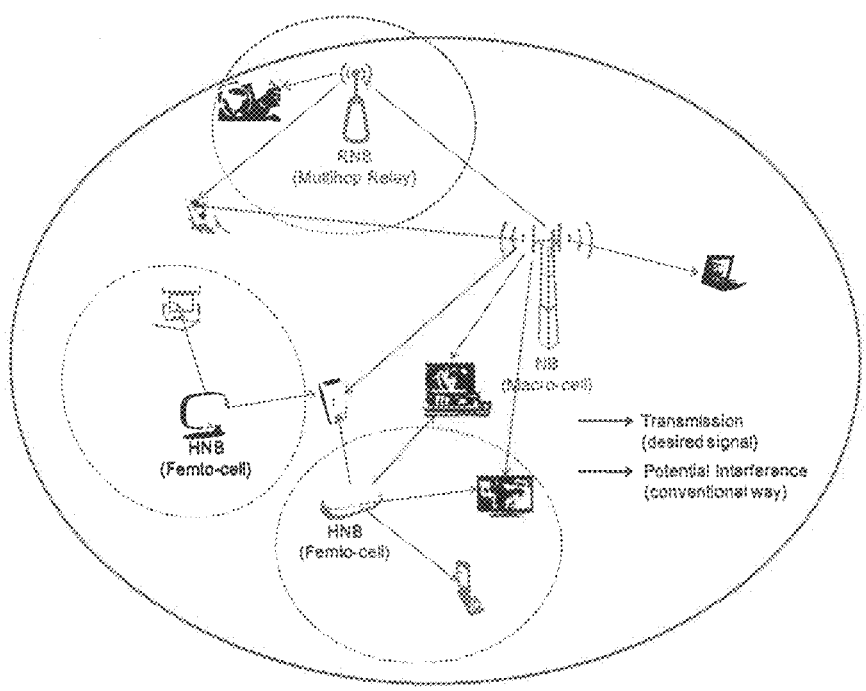
FIG. 1 is a schematic illustration of a typical cellular communication network including a multi-hop relay and a femto cell deployment.

With the presence of small cells, overlying a macrocell, power leakage becomes a significant issue, such as when high QoS services are required by a mobile station. Then, the power at the cell edge of a small cell could be sufficiently high that interference to and from adjacent cells can arise. This phenomenon is illustrated in FIG. 1, which shows a base station (NB) defining a macrocell, the practical bounds of which are defined by the large solid ellipse. The NB is able to communicate directly with user equipment (UE), and additionally with a multihop relay (RNB). The RNB can enhance the communication possibility within a smaller zone (defined by a broken elliptical line). Further, femto-cells, which might be home installations, (HNB) define further small cells of usable transmission range, for use in communication with UEs. As shown in FIG. 1, UEs might have a desired signal to receive, such as a local HNB if in range, or the NB if the UE is not in range of a smaller cell. However, despite not being within the formal range of a small cell, such a device might be in receipt of interference from broadcasts of those HNBs and RNBs.

Figure 2:
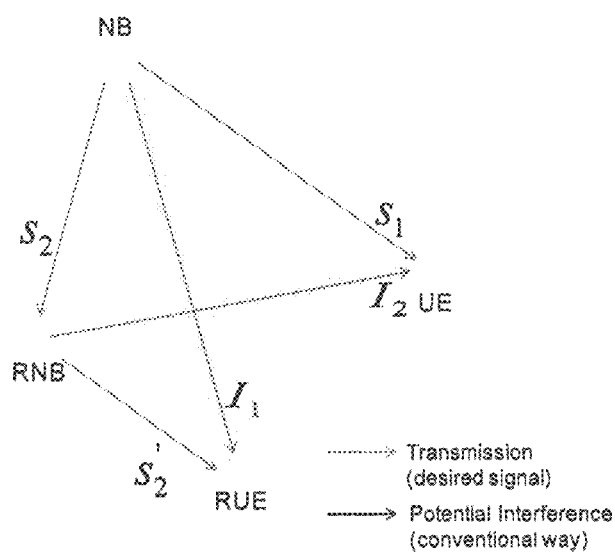
FIG. 2 is a schematic vector diagram of communication pathways in a typical example.

FIG. 2 illustrates in a simpler form the signals involved in establishing communication between an NB and a user equipment. The user equipment in FIG. 2 is designated RUE and UE respectively, RUE being that associated with a multihop relay RNB and the user equipment UE not being so associated. In order to communicate with user equipment UE, the base station NB sends a signal S1 thereto. A signal S2 is sent to the multihop relay RNB, which then passes a consequent signal S2' on to the user equipment RUE. Corresponding interference signals from the NB and the RNB, I1 and I2 respectively, are encountered by the RUE and the UE respectively.

Figure 3:
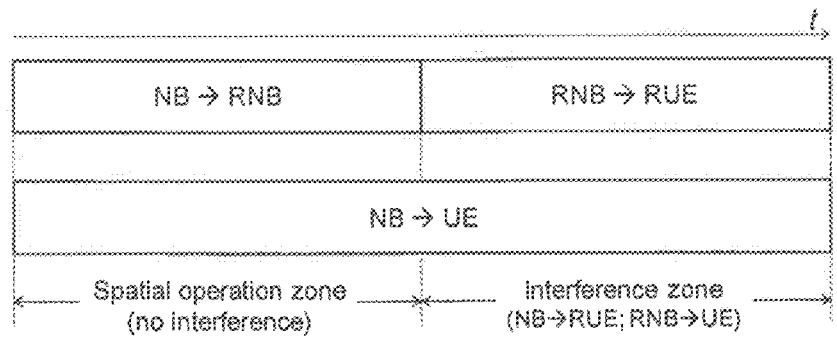
FIG. 3 is a transmission signal diagram demonstrating possible instances of interference in an SDMA communication.

This phenomenon can be also explained further by reference to FIG. 3. This figure shows a frame structure in which, in a first time period characterised by spatial operation, signals are beamformed to the RNB and the UE respectively, while a second time period is associated with interference between signals emanating from the RNB and the NB, both directed to the UE.

An embodiment described herein provides a mechanism to pre-eliminate the potential interference of a transmission for use in wireless communications such as the presently standardised network MIMO approach and its further developments.

While specific implementation of an embodiment, given the following detailed description, will be evident to the skilled reader, the reader is appraised that an embodiment can be implemented by means of a computer program product, which might be delivered on computer readable storage means or by way of a signal. The product may provide a full implementation of an embodiment or may rely on general purpose functional elements, which may be hardware or software implemented, in order to configure a computer to perform in accordance with that embodiment.

As shown in FIG. 2, $S_1$ is the signal from NB to UE in macro-cell, $S_2$ is the signal from NB to RNB. For only $S_1$ and $S_2$, communication can be conventionally supported with a simple consideration of MU-MIMO implementation. However, if the simple MU-MIMO concept is applied to this scenario, it will potentially cause interference, $I_1$, as indicated in the figure, which is from NB to RUE. Furthermore, without proper control, interference will potentially arise when the RNB starts transmitting, the $I_2$, from the RNB to UE, as also shown in FIG. 2.

It is noted that both of the interferences $I_1$ and $I_2$ will only arise during a relaying transmission, as indicated in FIG. 3 as the "interference zone".

Two embodiments described below provide approaches to accommodate and avoid the impact of this interference.

In a first embodiment, focus is placed on interference avoidance and elimination. As shown in FIG. 2 and described previously, there are conceptually three users on the NB during the whole packet transmission, namely UE, RNB and RUE. The MU-MIMO concept can be applied to transmit virtually to the three users, for which precoding is applied at the NB to support the three users by virtually transmitting to the three users simultaneously to avoid interference. This is despite there not being any physical transmission to the RUE from the NB.

To achieve this, the NB must have the capability to provide sufficient spatial freedom, that is the capacity for support of at least three users in this case. Under current technical specifications for such equipment, this normally relies on antenna configurations, which means that the NB needs at least three antenna sets.

Here, it is assumed that the NB is equipped with antenna sets intending to support two users simultaneously, as specified, RNB and UE. Consequently, it can also be capable to support UE and RUE, as the two different users.

Therefore in this embodiment, initially precoding is applied at the NB to support the UE and the RUE, rendering transmissions to the UE and RUE spatially orthogonal. Next, precoding is applied at the NB to support the UE and the RNB but the precoding at the UE should be maintained as for the first stage.

With this procedure, interference potentially arising from the NB to the RUE can be safely avoided. This operation does not require extra degrees of freedom on NB, for instance the provision of any extra antenna set(s).

As the RNB only needs to support one user (RUE), conventional beamforming techniques could be employed to perform directional transmission to the RUE. However, due to the potential interference from RUE to UE as indicated, the beamforming has to be performed with due attention given to the interference. Thus, the RNB should treat both RUE and UE as its users (but UE as a "virtual user") to perform precoding, but actually providing only support for the RUE by using one precoding matrix specifically on the RUE. With this operation, there is no potential interference to the UE, so the NB and the RNB can perform transmission simultaneously, and effectively NB transmits to UE and RNB transmits to RUE without interfering with each other.

A second embodiment focuses on provision of a coordinated multiple-point transmitter. In the first embodiment, the problem to be addressed was treated with a conventional approach. However, in the second embodiment, the NB and the RNB are considered in combination as one joint network node to provide the service. An objective in this embodiment is to support the RUE and the UE by this composite node without the various consequent communications disturbing each other.

Without any limitations on the ability to consider NB and RNB as two independently functioning entities in the network, they can easily be operated in a coordinated manner in line with the concept of network MIMO.

However, there are several limitations on the deployment of a composite NB and RNB node. In practical applications, NB and RNB may well have fundamentally different backhaul support, signalling and controlling capacities, resource and power allocations, and so on.

It is reasonable to assume that RNB has no backhaul support and it has no capacity to control user access. The RNB may well have much lower transmit power than the NB. All of these present many challenges to the coordinated operation of the RNB and the NB. In this embodiment, despite these challenges, the coordinated multiple-point transceiver through combination of the effect of the NB and the RNB is realised.

As described previously, the NB is able to support two users, UE and RUE, thus it is capable of supporting MU-MIMO as it will have two or more antennas. In practical systems, it is now commonplace to provide multiple antennas at the NB to support multi-antenna and/or multi-user transmission. This might not be the case at an RNB; however, in any relaying system, the critical problem is spectrum efficiency.

In this embodiment, the NB performs both a relaying transmission to the relayed UE (RUE) and a normal transmission to its own UE, by sharing the same radio resource. In this embodiment, it is reasonable to assume that the NB has higher-level configurations than the RNB, and full control of the transmission. To achieve this, a remotely weighted transmission mechanism is used. The objective of this is to manage all of the potential interference and to convert the so-called interference into a desired signal. The mechanism and procedure are described as follows:

The NB initially divides the transmission to its target UE into two parts:
    A first part of the transmission is synchronised with the transmission from NB to RNB;
    A second part of the transmission is synchronised with the transmission from RNB to RUE;
The NB performs SDMA to transmit simultaneously to UE and RNB;

In contrast with conventional SDMA, in this first stage of the transmission, the NB also transmits to the RNB the signal/data of the second part of its transmission intended for its UE;

The RNB receives signal/data from both transmissions of NB to UE (2nd part) and NB to RNB;

After the first stage transmission, a second stage of the transmission comprises the NB and the RNB jointly performing coordinative transmission to the UE and the RUE;

In the coordinative transmission, the NB and RNB are jointly weighted to support both UE and RUE;

The weighting matrix on RNB is remotely derived by the NB and transmitted to the RNB by weighting the transmission from the NB and the RNB at the first stage of the transmission;

The remotely weighted approach is not only applied to the desired signal/data, but also applied to any remaining interference form the system inside;

For the remaining interference, or, potentially remaining interference, the NB initially produces a nulling space for the interference;

The NB weights antenna sets on both the NB and the RNB to steer the interference towards the nulling space, which eventually moves the interference away from the UE and the RUE.

This approach enables interference-free transmission within such radio-resource sharing configurations.

Furthermore, the operations are all performed at the NB but take advantage of the RNB as an extra spatial freedom for both generation of a desired signal and avoidance or management of potential/remaining interference. A further advantage of this is that it achieves the relaying transmission in a conventional manner without requiring any additional function from the RNB.

For this embodiment of the invention, the basic configuration comprises an NB with a minimum of two antennas, and an RNB with one or more antennas. The UE and RUE also each have at least one antenna.

It will be appreciated that any extensions of this configuration and its various combinations are clearly possible with the same principles.

For both multiuser transmission with M transmitter antennas and N users, and, multi-antenna system with M transmitter antennas and N receiver antennas, the system can be modelled as $$y = Hx + n \quad (1)$$

where $x=[x_1, x_2, \ldots, x_M]^T$ and $y=[y_1, y_2, \ldots, y_M]^T$ are the transmitted and received sequence, respectively, with the noise vector $n=[n_1, n_2, \ldots, n_N]^T$ and the N×M channel matrix H.

For simplicity without loss of generality in precoding, the symbols prior to precoding are defined as $v=[v_1, v_2, \ldots, v_N]^T$ to be transmitted. v can be processed linearly or non-linearly. The processed v is defined as u. For linear precoding, v does in fact not need to be processed, thus, u=v. However, for non-linear precoding, it can be processed as $$u = v + \tau\lambda \quad (2)$$

where $\tau$ is a constant related to the constellation size and $\lambda=[\lambda_1, \lambda_2, \ldots, \lambda_N]^T$ is a complex vector.

A generic precoding matrix is defined as W. The precoded sequence, s, can be expressed as $$s = Wu \quad (3)$$

Prior to transmission, the precoded symbols need to be scaled, which is required in order to ensure no increase in transmit power due to the precoding operation, such that $$x = \frac{s}{\sqrt{\gamma}} \quad (4)$$

where the scaling factor $\gamma=\|s\|^2$ and $\rho=1/\sqrt{\gamma}$.

Now, equation (1) can be extended to $$y = \rho H W u + n \quad (5)$$

It should be noted here that the precoding matrix, W, applies to any precoding algorithm, including both linear and non-linear precoding.

Focusing specifically on MU-MIMO precoding, based on equation (5), the received signal on each user can be expressed as $$y_k = H_k \sum_{i=1}^{N} \rho_i W_i u_i + n_k \quad (6)$$

Figure 4:
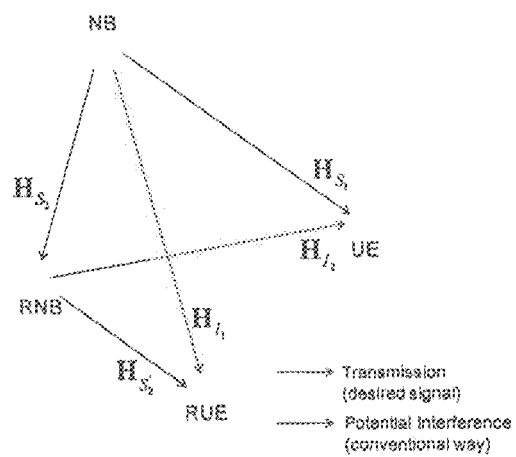
FIG. 4 is a schematic vector diagram of communication pathways in accordance with a described embodiment.

Now with reference to FIG. 2, the related transmission channel is represented in FIG. 4. With the NB performing MU-MIMO to the UE and the RNB, the received signal at the UE and the RNB can be expressed as $$y_{UE} = \rho_{UE} H_{S_1} W_{UE} u_{UE} + \rho_{RNB} H_{S_1} W_{RNB} u_{RNB} + n_{UE}$$

$$y_{RNB} = \rho_{RNB} H_{S_2} W_{RNB} u_{RNB} + \rho_{UE} H_{S_2} W_{UE} u_{UE} + n_{RNB} \quad (7)$$

For optimised precoding, $$H_{S_1} W_{RNB} = 0$$

$$H_{S_2} W_{UE} = 0 \quad (8)$$

In that case, there is no interference within the MU-MIMO transmission. However, in a practical transmission, the interference needs to be considered. For this purpose, the interference terms are always retained in equations here and later.

As shown in FIG. 3, the transmission has two parts; the first part is the transmission from NB to UE and NB to RNB, and the second part is the transmission from NB to UE and RNB to RUE.

Due to the potential interference as described previously, the following transmission mechanism and procedures are used in accordance with this embodiment.

The transmission sequence is separated into two parts:

$$u_{UE} = [u_{UE_{p1}}, u_{UE_{p2}}] \quad (9)$$

The $u_{UE_{p1}}$ the transmission part synchronised with NB-RNB and the $u_{UE_{p2}}$ is the transmission part synchronised with RNB-RUE.

The NB transmits the $u_{UE_{p2}}$ to the RNB while NB performs transmission to UE and RNB.

Then, $$y_{UE} = \rho_{UE_{p1}} H_{S_1} W_{UE_{p1}} u_{UE_{p1}} + \quad (10)$$
$$\rho_{RNB} H_{S_1} W_{RNB} u_{RNB} + \rho_{RNB} H_{S_1} W_{RNB} u_{UE_{p2}} + n_{UE}$$
$$y_{RNB} = \rho_{RNB} H_{S_2} W_{RNB} u_{RNB} + \rho_{RNB} H_{S_2} W_{RNB} u_{UE_{p2}} +$$
$$\rho_{UE_{p1}} H_{S_2} W_{UE_{p1}} u_{UE_{p1}} + n_{RNB}$$

As indicated in equation (10), this is specific to the first part of transmission. The $u_{UE_{p2}}$ transmitted to RNB is in preparation for the second part of the transmission, in which the NB and RNB coordinate.

The second, coordinative transmission includes two signals:

$u_{RUE}$—which is the signal transmitted from RNB to RUN; and $u_{UE_{p2}}$—which is the second part of signal transmitted from NB to UE.

$u_{RUE}$ is in factor the same signal as the $u_{RNB}$, which is the relayed signal from NB to RUE. The two required signals are available to both NB and RNB, which enable the requirement of the coordinative transmission. For the coordinative transmission from both NB and RNB, the channel conditions are changed as well. For simplicity, the joint channel can be expressed as On UE, $H_{UE\_c} = [H_{S_1}, H_{I_2}]^T$ On RUE, $H_{RUE\_c} = [H_{S_2}, H_{I_1}]^T$ With this transmission, the original interference channels are now transferred to the signal channels for the coordinative operations.

$$y_{UE} = \rho_{UE_{p2}} H_{UE\_c} W_{UE_{p2}} u_{UE_{p2}} + \rho_{RUE} H_{UE\_c} W_{RUE} u_{RUE} + n_{UE_{p2}} \quad (11)$$

$$y_{RUE} = \rho_{RUE} H_{RUE\_c} W_{RUE} u_{RUE} + \rho_{UE_{p2}} H_{RUE\_c} W_{UE_{p2}} u_{UE_{p2}} + n_{RUE}$$

The precoding weights, $W_{UE_{p2}}$ and $W_{RUE}$, are the coordinative weights on both NB and RNB antenna sets. The weights on the RNB are calculated on NB and delivered to the RNB together with the signals transmitted to the RNB.

The weighting factors for the two signals transmitted to the RNB as described previously could depend upon the precoding weights to RUE or UE in the second part of the transmission.

NB and RNB coordinatively steer interference to nulling space. This is achieved as follows. The transmission includes two required signals as indicated in equation (11), which are:

$u_{UE_{p2}}$—the second part of transmission from NB to UE $u_{RUE}$—the relayed signal transmitted from RNB to RUE As described in equation (10), three signals are transmitted during the first part of transmission. With an optimal SDMA, only $u_{UE_{p2}}$ and $u_{RUE}$ should be seen during the second transmission as described in equation (11).

However, in a practical application, it is rare to have an optimal deployment, such that the SDMA operation during the first transmission might not have an ideal precoding to guarantee the orthogonal transmission from the NB to UE and RNB.

As indicated in equation (10), there might be three potential sources of interference during the first transmission.

$\rho_{RNB} H_{S_1} W_{RNB} u_{RNB}$: an interference to UE from the signal transmitted from NB to RNB;

$\rho_{RNB} H_{S_1} W_{RNB} u_{UE_{p2}}$: an interference to UE from the second part of the signal transmitted to the UE; and $\rho_{UE_{p1}} H_{S_1} W_{UE_{p1}} u_{UE_{p1}}$: an interference to RNB from the first part of the signal transmitted to the UE.

During the second transmission, only the third interference could remain as it is the interference to RNB, which could be retransmitted through the RNB.

The interference can be predicted after the precoding performed at the NB during the first transmission. Hence, just at the beginning of the second transmission, the interference might be precoded through the antenna sets of NB and RNB.

For this, the NB has to produce a virtual user channel for the interference, $H_{v\_I}$, to meet the requirement of $$\begin{cases} H_{v\_i} H_{UE\_c}^T = 0 \\ H_{v\_i} H_{RUE\_c}^T = 0 \end{cases} \quad (12)$$

in which case the virtual interference channel is uncorrelated to all the channels of the desired signals.

In other words, the $H_{v\_I}$ is the null space for $H_{UE\_c}$ and $H_{RUE\_c}$. Therefore, the precoded interference can be expressed as $$y_{i\_UE_{p1}} = H_{v\_i} W_{v\_i} u_{UE_{p1}} \quad (13)$$

$$= H_{v\_i} \begin{bmatrix} \gamma_{v\_i} w_{v\_i\_NB\_1} \\ \gamma_{v\_i} w_{v\_i\_NB\_2} \\ \rho_{UE_{p1}} H_{S_2} W_{UE_{p1}} w_{v\_i\_RNB} \end{bmatrix} u_{UE_{p1}}$$

$\gamma_{v\_I}$ is the power control on NB to limit the $u_{UE_{p1}}$ impact on the second transmission, even though $\gamma_{v\_I}$. Also, the $w_{v_i\_RNB}$ might have an impact on the desired signal.

Ideally, the $w_{v_i\_RNB}$ needs to be optimised together with the weights on the desired signal of the second transmission.

To simplify the problem, the precoding matrix might be only applied at the NB based on the existing weighting factor at the RNB:

$$y_{i\_UE_{p1}} = H_{v\_i} \begin{bmatrix} \gamma_{v\_i} w_{v\_i\_NB\_1} \\ \gamma_{v\_i} w_{v\_i\_NB\_2} \\ \rho_{UE_{p1}} H_{S_2} W_{UE_{p1}} \end{bmatrix} u_{UE_{p1}} \quad (14)$$

With regard to equations (13) and (14), there are two special cases that should be considered:

Case I: Known Channel State Information

The key issue when channel state information is known, is the accuracy thereof that can be obtained by the eNB and, more particularly, that the $H_{S_2}$ might need to be.

Case-II: Unknown Channel State Information

In this case, the eNB might be able to be retain information of its experience of the system operation, when the $H_{S_2}$ is not fully detected. The $H_{S_2}$ then becomes unknown or, more precisely, becomes uncertain.

Case I relies heavily on the channel estimation engine and feedback mechanism(s) operated in the system. In this case, the interference can be easily steered away on the same plane of the desired signals.

In case II, there might not be complete lack of knowledge of channel information but it might be not accurate, so the third weighting factor, $\rho_{UE_{p1}} H_{S_2} W_{UE_{p1}}$, becomes uncertain. However, this is coherent interference that needs to be taken into account.

Figure 6:
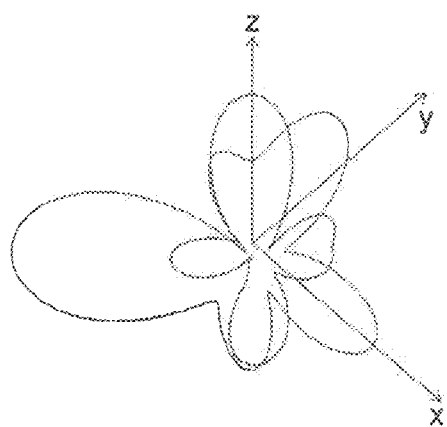
FIG. 6 is a diagram illustrating 3D beamforming as used in a described embodiment.

For both cases, one solution is to apply 3D beamforming effectively to steer the interference out of the plane of the desired signal to avoid any uncertainties. It is well-understood that multi-dimensional beamforming can be decomposed into two linear step processes, on either a planar phased array beamformer or a linear array beamformer. For a currently practical 3D beamformer, it is complicated to steer in different directions in the 3D domain, and an example illustrating this is set out below. In the present embodiment, the desired signals are transmitted on one plane and the 3D beamforming applied here is only to steer the interference to the orthogonal plane as demonstrated in FIG. 6, which highly simplifies the beamforming processing.

Targeting on drawbacks of those conventional relaying systems, especially on low efficiency of transmission and/or potential interference with radio resource sharing, the presently described approach uses a remotely weighted SDMA mechanism to allowing a base station to support relaying transmission and its normal macro-cell transmission simultaneously with shared radio resources.

To avoid any potential interference caused inside the system, two methods have been described above. The first method involves interference avoidance and elimination, which applies formed beam(s) on interference. The second method is characterised by coordinated multiple-point transmission.

The coordinative transmission is proposed to co-ordinatively support a macro-cell mobile terminal and a relaying mobile terminal on both a macro base station and a relay station.

In a practical cellular system, the two methods can be flexibly operated according to deployment conditions and environments. For an isolated relaying transmission coverage, where any relayed mobile terminal is not able to communicate with the macro base station, and the relay station has no impact on any macro mobile terminal, the coordinative transmission may not be required.

Figure 5:
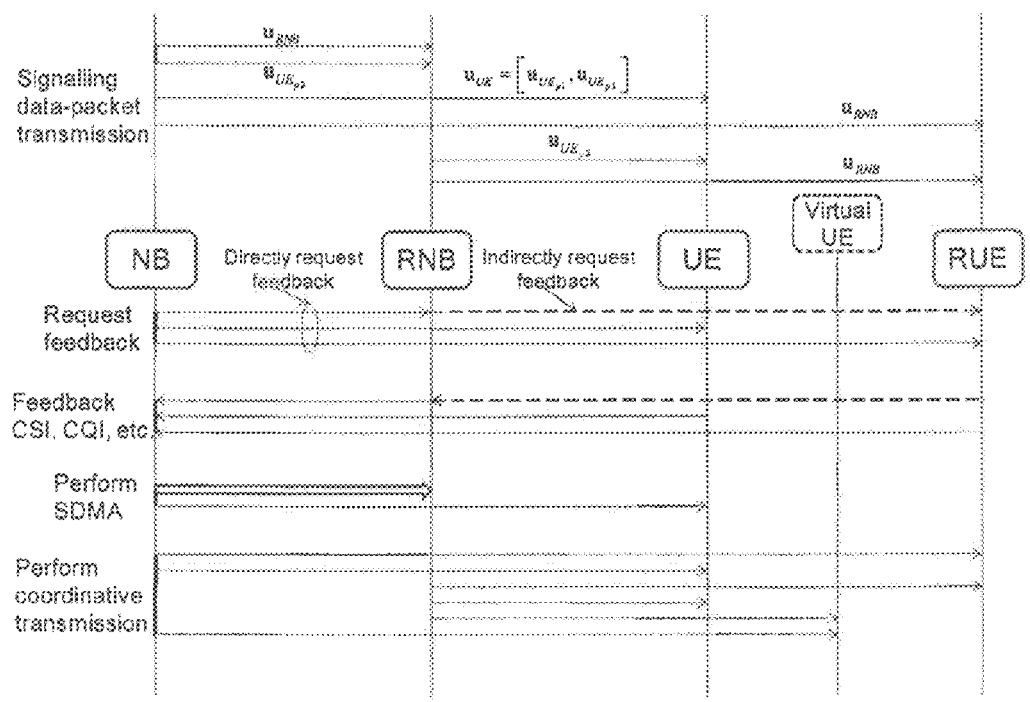
FIG. 5 is a schematic communication process diagram for a method of communicating in accordance with a described embodiment.

An operational procedure is depicted in FIG. 5, as an example to show the key steps of the coordinative transmission. However, this process might be only a part of the practical operation. Since the operation is fully controlled by the macro base station, the base station is able to determine the best mode of operation based on the practical deployment and environment.

Fundamentally, the base station will request all feedback from the relay station (RNB), the relayed mobile user (RUE) and the macro mobile user (UE). It is possible for the macro base station to collect all the channel state information for the channels between the mobile terminals and the relay station and macro base station. Consequently, it is possible for the base station to determine the potential interference in the system. It is also reasonable to assume that the base station is fully aware of the antenna configurations of the relay station and mobile terminals.

If the relay station covers a fairly isolated area as mentioned previously, the macro base station can employ SDMA to the relay station and the macro mobile terminal and the relay station can directly transmit to the relayed mobile terminal, without any need for interference avoidance.

In the event that the mobile terminals can see both the macro base station and the relay station, the second embodiment involving coordinated multiple-point transmitter can be employed. The key operation of the coordinated multiple-point transmitter is on both the macro base station and the relay station. Besides the precoding on the desired signal, it also performs precoding on interference to steer the interference away from the desired signal.

Providing multiple antennas on a relay station might create more spatial freedom for beamforming and/or interference elimination.

One possible advantage of an embodiment implementing the proposed remotely weighted SDMA transmission is that it is operated at the macro base station without any required extra functionality at a relay station or at mobile terminals. Even though it has been described in the context of multihop relay transmission, it can be extended to femto-cell transmission. The proposed mechanism provides high efficiency with radio resource sharing but interference-free relaying transmission.

Relay technologies have been actively studied and developed in the standardization process of next-generation mobile broadband communication systems, such as 3GPP LTE-Advanced, IEEE 802.16j, and IEEE 802.16m. One example is on 3GPP LTE.

Specifically, a Type-I Relay Station can assist a remote UE unit, which is located far away from an eNB (or a BS), to access the eNB. On the other hand, a Type-II Relay Station can help a local UE unit, which is located within the coverage of an eNB (or a BS) and has a direct communication link with the eNB, to improve its service quality and link capacity.

Figure 7:
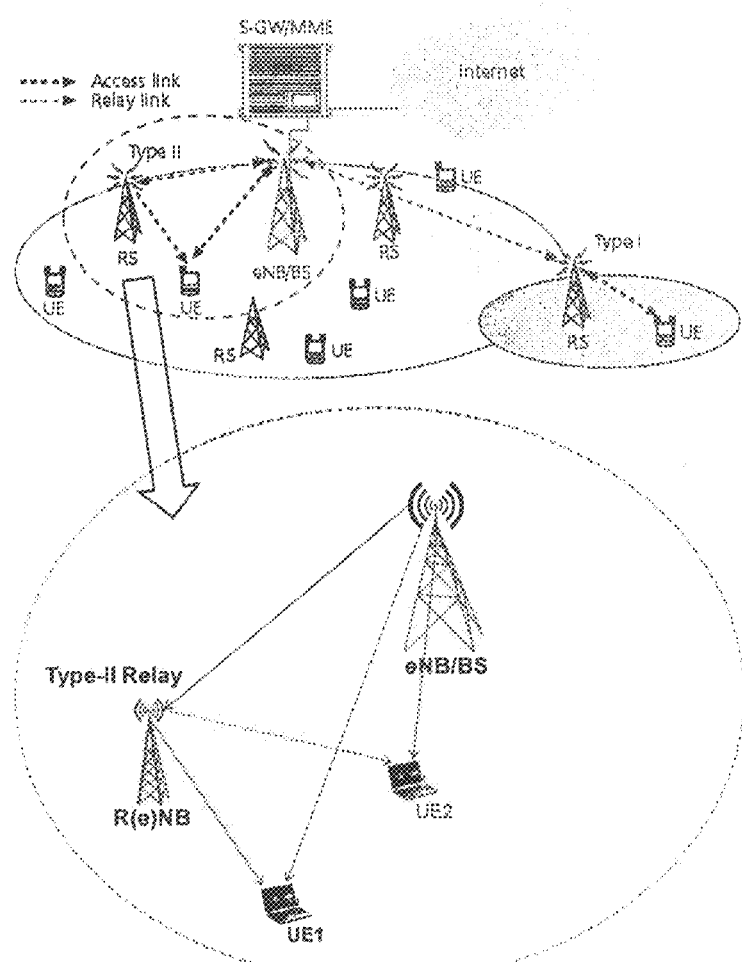
FIG. 7 is a schematic diagram illustrating a mode of implementation of the described embodiments.

The remotely weighted SDMA mechanism of the described embodiment can be deployed perfectly in the Type-II Relay Station scenario as shown in FIG. 7. With this transmission, the potential capacity can be double that of the current specification in the standard. The interface between eNB and RNB has been well defined between eNB and RNB for data transmission, which is suitable for the application of the proposal.

Figure 8:
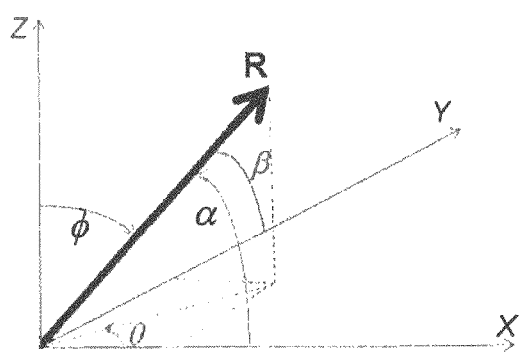
FIG. 8 is a vector diagram illustrating a method of formulating 3D beamforming in connection with a described embodiment.

For the 3D beamforming to steer away interference as described above, an example is now provided. A formulation for 3D beamforming is shown in FIG. 8. The decomposition of the 3D beamforming into two linear steps is expressed as follows:

$$B(f_i, \alpha, \beta, \phi, R) = \sum_{n=0}^{N-1} S_n(f_i, \beta, R) \cdot \left[\sum_{m=0}^{M-1} x_{nm}(f_i) \cdot S_m(f_i, \alpha, R)\right] \quad (15)$$

With the two separated steering vectors expressed as $$s_m(f_i, \alpha, R) = \exp\left\{j2\pi f_i\left(\frac{\sqrt{R^2 + x_m^2 - 2x_m R\cos\alpha} - R}{c}\right)\right\} \quad (16)$$

$$s_n(f_i, \beta, R) = \exp\left\{j2\pi f_i\left(\frac{\sqrt{R^2 + y_n^2 - 2y_n R\cos\beta} - R}{c}\right)\right\}$$

Following the same concept, further steering vectors can be obtained along the z-axis.

$$s_k(f_i, \phi, R) = \exp\left\{j2\pi f_i\left(\frac{\sqrt{R^2 + z_k^2 - 2z_k R\cos\phi} - R}{c}\right)\right\} \quad (17)$$

Then, while $\alpha \to \pi/2$, $\beta \to \pi/2$, $\phi \to 0$.

Consequently, in 3D beamforming, while the steering vector is pointing along the z-axis, there will be no energy along either x-axis or y-axis.

Whilst certain embodiments have been described, these embodiments have been presented by way of example only, and are not intended to limit the scope of the inventions. Indeed, the novel devices, methods and products described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

We claim:

1. A wireless communications station for establishing communication with first and second mobile stations, the wireless communication station being configured to communicate with the first mobile station directly and to communication with the second mobile station via a relay station, the wireless communications station comprising:
   a communications means for emitting a space division multiple access wireless communication signal including a first spatial component directed towards the first mobile station and a second spatial component directed towards the relay station; and
   precoding means for rendering the first and second spatial components substantially spatially orthogonal with respect to one another.

2. The wireless communications station in accordance with claim 1, wherein said preceding means forms said spatial components.

3. A wireless communications station for establishing communication with one or more mobile stations, either directly or via a relay station, the wireless communications station comprising:
   first communication means for emitting a first space division multiple access, SDMA, wireless communication signal, the first SDMA wireless communication signal including first and second spatial components, the first spatial component being directed towards a first user station and bearing a first portion of signal information intended for said first user station, the second spatial component being directed towards a relay station and including a second portion of signal information intended for said first user station and a third portion of signal information intended for a second user station; and
   second communication means for emitting a second SDMA wireless signal synchronised with re-emission of said second spatial component by said relay station, said second SDMA wireless signal and said re-emission in combination including third and fourth spatial components directed, respectively, to first and second mobile stations and bearing, respectively, said second portion and said third portion of signal information.

4. The wireless communications station in accordance with claim 3, wherein said first communication means transmits to said relay station beamforming information to enable said relay station to generate a third SDMA signal which, in combination with said second SDMA signal causes formation of said third and fourth spatial components.

5. The wireless communications station in accordance with claim 3, further comprising means for applying beamforming to said first and second SDMA signals, to direct interference away from said mobile stations.

6. The wireless communications station in accordance with claim 3, wherein the first communication means emits the second spatial component such that it is suitable for re-emission by a relay station without further processing thereby.

7. The wireless communications station in accordance with claim 6, further comprising means for generating said second SDMA wireless signal with regard to an assumption that the relay re-emits said second spatial component without further processing thereof.

8. The wireless communications station in accordance with claim 7, the means for generating generates said second SDMA wireless signal with regard to an assumption that the relay re-emits said second spatial component without spatial diversity.

9. A method of establishing communication between a wireless communication station and a first mobile station and a second mobile station directly and via a relay station, respectively, the method comprising:
   emitting a space division multiple access, SDMA, wireless communication signal including a first spatial component directed towards the first mobile station and a second spatial component directed towards the relay station; and
   precoding the first and second spatial components to render the components substantially spatially orthogonal with respect to one another.

10. The method in accordance with claim 9, wherein said precoding forms said spatial components.

11. A method of establishing communication with one or more mobile stations, either directly or via a relay station, the method comprising:
   emitting a first space division multiple access, SDMA, wireless communication signal, the first SDMA wireless communication signal including first and second spatial components, the first spatial component being directed towards a first user station and bearing a first portion of signal information intended for said first user station, the second spatial component being directed towards a relay station and including a second portion of signal information intended for said first user station and a third portion of signal information intended for a second user station; and
   emitting a second SDMA wireless signal synchronised with re-emission of said second spatial component by said relay station, said second SDMA wireless signal and said re-emission in combination including third and fourth spatial components directed, respectively, to first and second mobile stations and bearing, respectively, said second portion and said third portion of signal information.

12. The method in accordance with claim 11, further comprising transmitting to said relay station beamforming information to enable said relay station to generate a third SDMA signal which, in combination with said second SDMA signal causes formation of said third and fourth spatial components.

13. The method in accordance with claim 11, further comprising beamforming said first and second SDMA signals, to direct interference away from said mobile stations.

14. The method in accordance with claim 11, wherein the emitting emits the second spatial component in a form suitable for re-emission by a relay station without further processing thereby.

15. The method in accordance with claim 14, further comprising generating said second SDMA wireless signal with regard to an assumption that the relay re-emits said second spatial component without further processing thereof.

16. The method in accordance with claim 15, wherein the generating generates said second SDMA wireless signal with regard to an assumption that the relay re-emits said second spatial component without spatial diversity.

17. A computer program product comprising computer executable instructions which, when executed by a computer, cause said computer to perform a method in accordance with claim 9.

* * * * *